United States Patent
Kalakay, Jr.

(10) Patent No.: US 9,802,800 B2
(45) Date of Patent: Oct. 31, 2017

(54) APPARATUS FOR POSITIONING LOGS

(71) Applicant: Fred J. Kalakay, Jr., Fort Wayne, IN (US)

(72) Inventor: Fred J. Kalakay, Jr., Fort Wayne, IN (US)

( * ) Notice: Subject to any disclaimer, the term of this patent is extended or adjusted under 35 U.S.C. 154(b) by 0 days.

(21) Appl. No.: 13/974,478

(22) Filed: Aug. 23, 2013

(65) Prior Publication Data

US 2014/0054526 A1    Feb. 27, 2014

Related U.S. Application Data

(60) Provisional application No. 61/693,027, filed on Aug. 24, 2012.

(51) Int. Cl.
| | |
|---|---|
| *B66D 3/26* | (2006.01) |
| *B66C 23/20* | (2006.01) |
| *B27L 7/00* | (2006.01) |
| *A01G 23/00* | (2006.01) |

(52) U.S. Cl.
CPC ............. *B66D 3/26* (2013.01); *A01G 23/006* (2013.01); *B27L 7/00* (2013.01); *B66C 23/20* (2013.01)

(58) Field of Classification Search
CPC ... B66D 1/60; B66D 1/82; B66D 3/06; B66D 5/02; B66D 2700/026; B66D 2700/021; B66D 1/107; B66D 3/08; B66D 3/20; B66D 5/00; B66C 1/107; B66C 3/20; B66C 5/00; B66C 13/22; B66C 23/005; B66C 23/002; B66C 23/025; B66C 23/163; B66C 23/166; B66C 23/485; B66C 23/20; B27L 7/00
See application file for complete search history.

(56) References Cited

U.S. PATENT DOCUMENTS

| | | | | |
|---|---|---|---|---|
| 146,395 | A | * | 1/1874 | Kirkpatrick .................... 212/249 |
| 184,168 | A | * | 11/1876 | Nickle .......................... 212/249 |
| 249,413 | A | * | 11/1881 | Soseman ................. B66C 23/20 |
| | | | | 212/199 |
| 328,081 | A | * | 10/1885 | Sutherland ..................... 212/249 |
| 464,929 | A | * | 12/1891 | Cawhern ....................... 212/249 |
| 474,246 | A | * | 5/1892 | Haworth ....................... 212/249 |
| 486,412 | A | * | 11/1892 | Sawyer .................. B66C 23/20 |
| | | | | 212/199 |
| 493,690 | A | * | 3/1893 | Dumbauld .................... 212/249 |
| 845,143 | A | * | 2/1907 | Taylor ..................... B66C 23/20 |
| | | | | 212/179 |

(Continued)

OTHER PUBLICATIONS

Cub Cadet Operator's Manual, HP LS 25CC—Log Splitter, Apr. 26, 2011, accessible via World Wide Web from http://www.logsplittersdirect.com/manuals/cub27cchpmanual.pdf.

*Primary Examiner* — Emmanuel M Marcelo
*Assistant Examiner* — Michael Gallion

(57) ABSTRACT

An apparatus to drag logs to a log splitter from locations distant from the log splitter to locations near the log splitter, and then to assist with lifting logs for placement on the log splitter, comprises generally a mast-and-boom assembly with a first mount point and first pulley, and a second mount point and second pulley at a height below said first mount point and first pulley, a winch, and a cable attached a one end to said winch, threaded through said first pulley and said second pulley, and connectable at the other end to a log via a connection means, said apparatus being suitable for integration with a log splitter.

15 Claims, 3 Drawing Sheets

(56) References Cited

U.S. PATENT DOCUMENTS

| | | | | |
|---|---|---|---|---|
| 1,511,297 A * | 10/1924 | Pennoyer | | 212/201 |
| 1,543,129 A * | 6/1925 | Smith | | A22B 5/12 |
| | | | | 452/79 |
| 1,545,664 A * | 7/1925 | Kassebeer | | B66C 23/20 |
| | | | | 212/172 |
| 1,855,391 A * | 4/1932 | Fagonde | | A22B 5/208 |
| | | | | 452/160 |
| 2,496,401 A * | 2/1950 | McKinney | | 414/543 |
| 2,902,177 A * | 9/1959 | Stoddard et al. | | 212/309 |
| 2,904,826 A * | 9/1959 | Hotard | | A22B 5/208 |
| | | | | 452/160 |
| 2,979,762 A * | 4/1961 | Schulz | | A22B 5/02 |
| | | | | 452/55 |
| 3,181,707 A * | 5/1965 | Janssen | | 212/202 |
| 3,559,817 A * | 2/1971 | Brown | | B66C 13/18 |
| | | | | 212/231 |
| 3,671,015 A * | 6/1972 | Sullivan | | 254/332 |
| 3,797,679 A * | 3/1974 | Hunter | | B66C 23/48 |
| | | | | 180/271 |
| 3,834,436 A * | 9/1974 | Burkett | | 144/366 |
| 4,155,463 A * | 5/1979 | Buzzichelli et al. | | 212/196 |
| 4,216,868 A * | 8/1980 | Geppert | | G01D 5/34792 |
| | | | | 212/278 |
| 4,216,947 A * | 8/1980 | Chausse | | 269/71 |
| 4,271,970 A * | 6/1981 | Miller | | B66C 13/02 |
| | | | | 212/232 |
| 4,351,378 A | 9/1982 | Smith | | |
| 4,398,581 A * | 8/1983 | Aikins et al. | | 144/366 |
| 4,411,299 A * | 10/1983 | Alcott | | 144/193.1 |
| 4,431,362 A | 2/1984 | Smiley | | |
| 4,483,379 A | 11/1984 | Aikins | | |
| 4,487,239 A * | 12/1984 | Anderson | | 144/195.1 |
| 4,529,064 A * | 7/1985 | D'Andrea, Jr. | | 212/196 |
| 4,544,008 A | 10/1985 | Reini | | |
| 4,559,985 A * | 12/1985 | May | | 144/195.1 |
| 4,561,479 A * | 12/1985 | Burdine | | 144/195.2 |
| 4,838,439 A * | 6/1989 | Baziuk | | 212/179 |
| 4,881,864 A * | 11/1989 | Amato | | 414/543 |
| 5,160,238 A * | 11/1992 | Kambara | | 414/663 |
| 5,314,202 A * | 5/1994 | Wilkins, Jr. | | 280/511 |
| 5,445,281 A * | 8/1995 | Hung | | 212/179 |
| 5,458,250 A * | 10/1995 | Martinez | | 212/271 |
| 5,509,638 A * | 4/1996 | Leon-Vieito | | 254/270 |
| 5,562,534 A * | 10/1996 | McGough | | 452/187 |
| 5,662,451 A * | 9/1997 | Muzzi et al. | | 414/540 |
| 5,752,799 A * | 5/1998 | Carey et al. | | 414/543 |
| 5,791,858 A * | 8/1998 | Sasser | | 414/462 |
| 5,800,000 A * | 9/1998 | Shockley | | 294/81.3 |
| 5,967,206 A * | 10/1999 | Milton | | 144/195.1 |
| 6,045,442 A * | 4/2000 | Bounds | | 452/187 |
| 6,095,349 A | 8/2000 | O'Meara | | |
| 6,189,866 B1 * | 2/2001 | Harkins et al. | | 254/332 |
| 6,202,868 B1 * | 3/2001 | Murray | | 212/294 |
| 6,234,453 B1 * | 5/2001 | Block | | 254/285 |
| 6,640,852 B1 | 11/2003 | Rogers | | |
| 6,705,821 B2 | 3/2004 | Philipps | | |
| 6,981,834 B1 * | 1/2006 | Henry | | 414/462 |
| 6,994,618 B1 * | 2/2006 | Syers | | A22B 5/06 |
| | | | | 452/187 |
| 7,011,123 B2 * | 3/2006 | Peterson | | 144/195.1 |
| 7,059,956 B1 * | 6/2006 | Summerlin | | 452/192 |
| 7,201,552 B1 * | 4/2007 | Angel et al. | | 414/462 |
| 7,350,770 B1 * | 4/2008 | Boyer | | 254/332 |
| 7,458,563 B1 * | 12/2008 | Liu | | 254/334 |
| 7,568,876 B1 | 8/2009 | Tenney | | |
| 7,625,269 B2 * | 12/2009 | Godwin | | 452/129 |
| 7,845,622 B1 * | 12/2010 | Riggs | | 254/326 |
| 7,913,726 B1 * | 3/2011 | Honnell | | 144/4.6 |
| 7,913,980 B1 * | 3/2011 | Cipriano | | 254/393 |
| 7,931,524 B2 * | 4/2011 | McKenzie | | 452/187 |
| 8,550,065 B2 * | 10/2013 | Johnson | | 126/30 |
| 8,602,393 B1 * | 12/2013 | Huffman | | 254/323 |
| 2003/0071252 A1 * | 4/2003 | Halas | | 254/334 |
| 2005/0224289 A1 * | 10/2005 | Barnett | | 182/127 |
| 2006/0163186 A1 * | 7/2006 | Choate et al. | | 212/175 |
| 2006/0283825 A1 * | 12/2006 | Waisanen | | 212/175 |
| 2007/0248443 A1 * | 10/2007 | Stucks | | A22B 5/06 |
| | | | | 414/462 |
| 2007/0256998 A1 * | 11/2007 | Kumar | | 212/255 |
| 2008/0085669 A1 * | 4/2008 | Burrows | | 452/187 |
| 2009/0095944 A1 * | 4/2009 | Gaines | | 254/334 |
| 2009/0152227 A1 * | 6/2009 | Thompson et al. | | 212/348 |
| 2011/0048581 A1 | 3/2011 | Hicks | | |
| 2011/0053482 A1 * | 3/2011 | McKenzie | | 452/187 |
| 2013/0075353 A1 * | 3/2013 | Thompson | | 212/180 |
| 2015/0201629 A1 * | 7/2015 | Lockwood | | A22B 5/161 |
| | | | | 452/125 |

* cited by examiner

APPARATUS FOR POSITIONING LOGS

CROSS-REFERENCES TO RELATED APPLICATIONS

This Application claims priority to, and incorporates and restates, Provisional Application No. 61/693,027, filed Aug. 24, 2012

STATEMENT REGARDING FEDERALLY SPONSORED RESEARCH OR DEVELOPMENT

Not applicable

BACKGROUND

Existing mechanisms for positioning logs in connection with a log splitter suffer notable deficiencies, including specifically expensive and complex hydraulic drive apparatuses and limited ability to haul logs toward the splitter from a distance or to apply force to move a log laterally. Many existing apparatuses are, similarly, disconnected from log splitters, requiring the user to haul both a log splitter and a positioning or hauling apparatus separately into the field.

Known apparatuses pose a number of challenges to users. Hydraulic drive systems for positioning logs are costly to purchase and costly and time-consuming to maintain. Such systems are also generally limited to performing one independent function at a time. Further, systems for positioning logs known to the art are generally unable to exert any significant lateral force. The inability of existing apparatuses to exert significant lateral force makes such apparatuses incapable of bringing, or at least poorly adapted to bring logs distant from a log splitter to the splitter. This limitation diminishes the utility of existing apparatuses significantly, since they can only be used to aid in positioning the logs in the splitter after the logs have been manually carried to the splitter from a distance location. Existing apparatuses are also not adapted to be integrated directly with the log splitter, making transport of the positioning apparatus into the field more difficult and cumbersome than necessary.

There is a need for a low maintenance, reliable, economic log retrieval and lift apparatus that overcomes these deficiencies.

SUMMARY

The present invention overcomes deficiencies of log positioning devices known to the art by providing a positioning apparatus adapted to be integrated directly with a log splitter, capable of dragging logs distant from the splitter to the splitter, and further capable of aiding a user in positioning logs on the splitter. Embodiments of the present invention comprise a mast capable of being fixedly connected to a log splitter, a boom support rotatably connected to said mast, a boom arm fixedly connected to the boom support, a winch connected to one of the boom arm and the boom support, an electric motor operatively connected to the winch, a first pulley connected to the boom arm at a position remote from the mast, a second pulley connected to the apparatus at a position below the first pulley, and a cable operatively connected to the electric motor at one end, adapted for connection to logs at the other end, and routed through the first and second pulleys such that lateral force applied to the end of the capable adapted for connection to logs is translated to vertical force by the boom arm, wherein the apparatus can be both to move a log remote from the splitter closer to the splitter and to lift a log from the ground to position it for splitting on the splitter.

BRIEF DESCRIPTION OF THE DRAWINGS

These and other features, aspects, and advantages of the present invention will become better understood with regard to the following description and accompanying drawings, where.

DESCRIPTION

Figure 1:
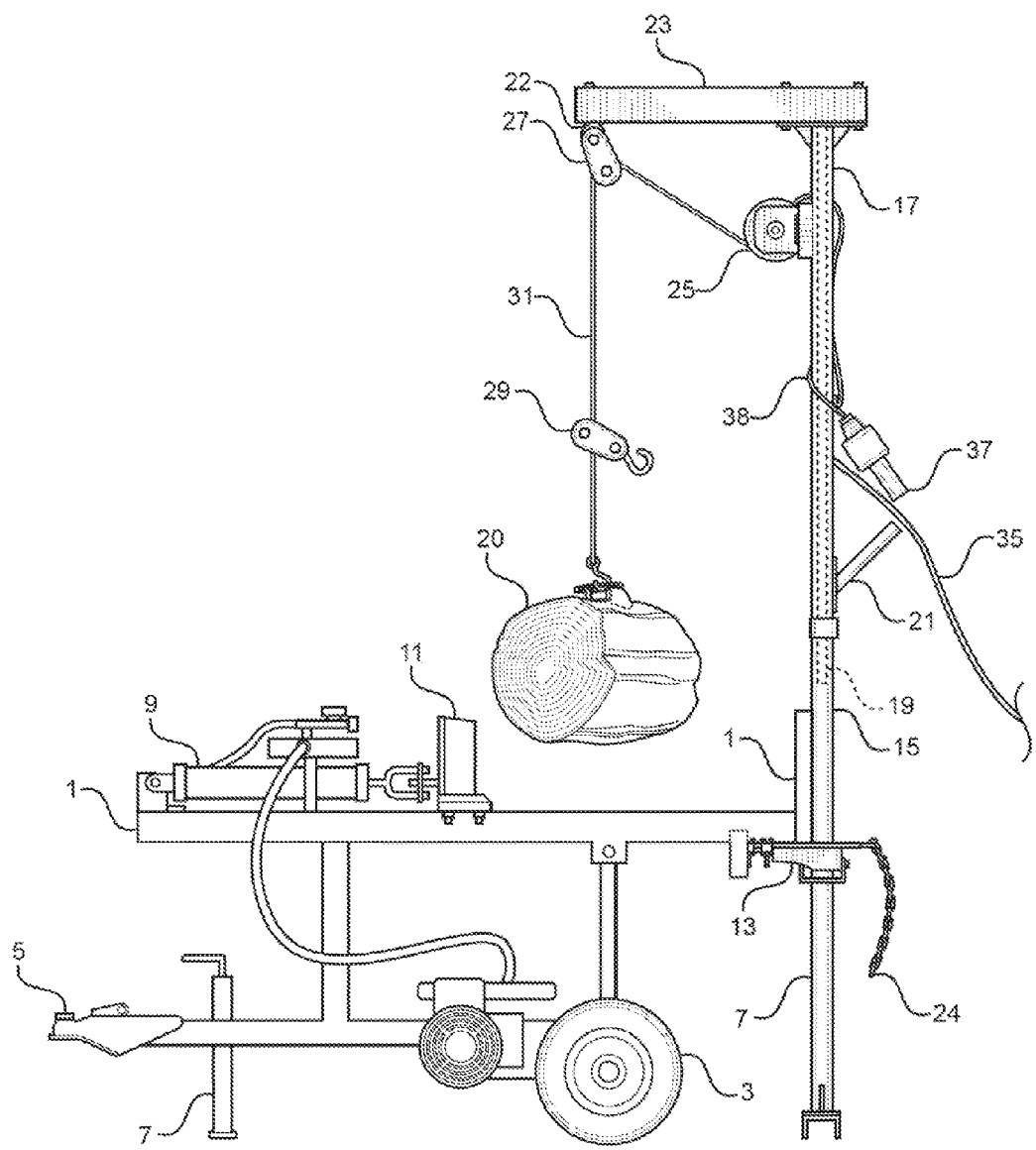
FIG. 1 is a side view of the an embodiment of the present invention mounted to a horizontal log splitting machine.
Figure 2:
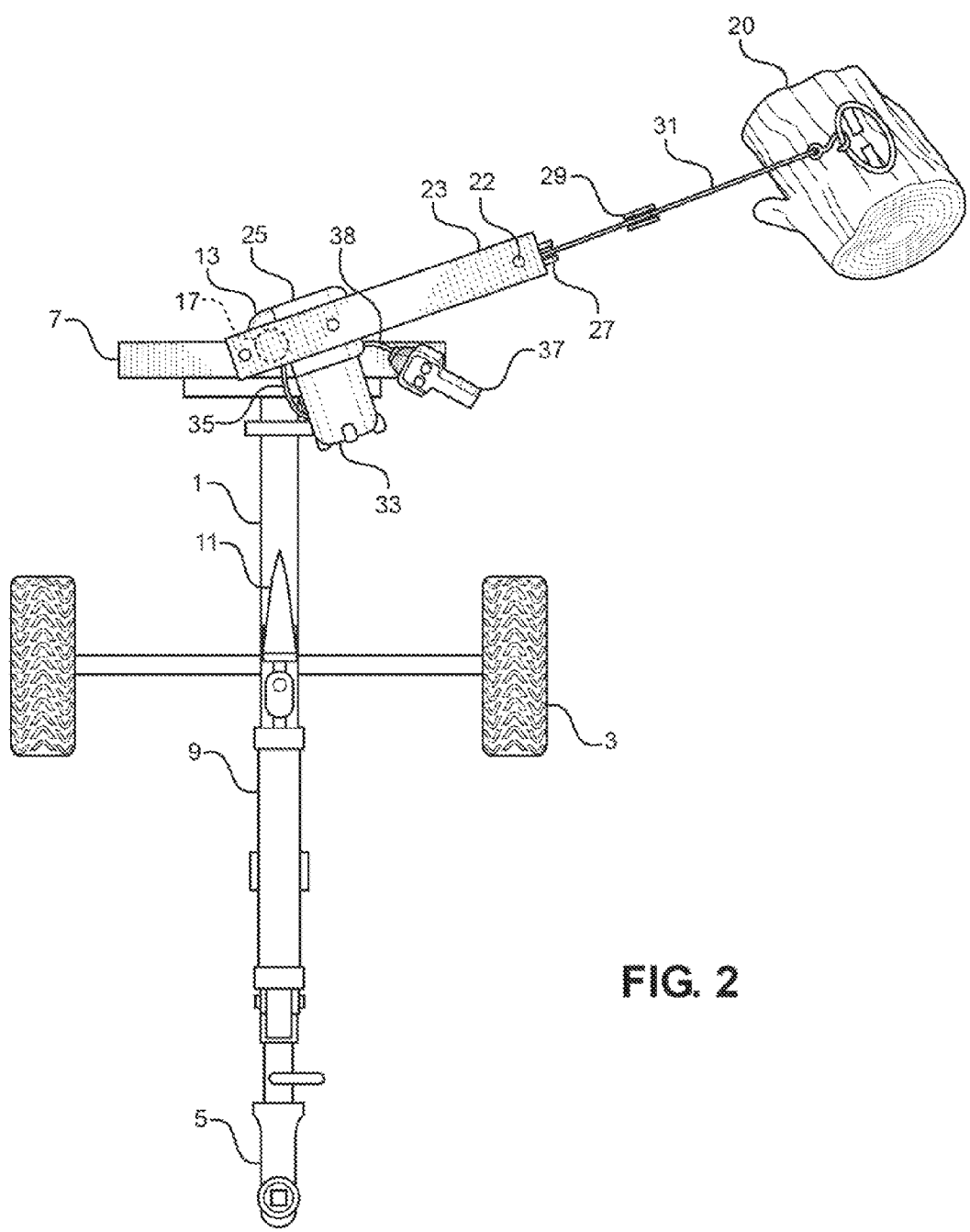
FIG. 2 is a top-down view of an embodiment of the present invention mounted to a horizontal log splitting machine, wherein a log has been dragged to machine by use of the invention and is ready for final positioning prior to splitting.
Figure 3:
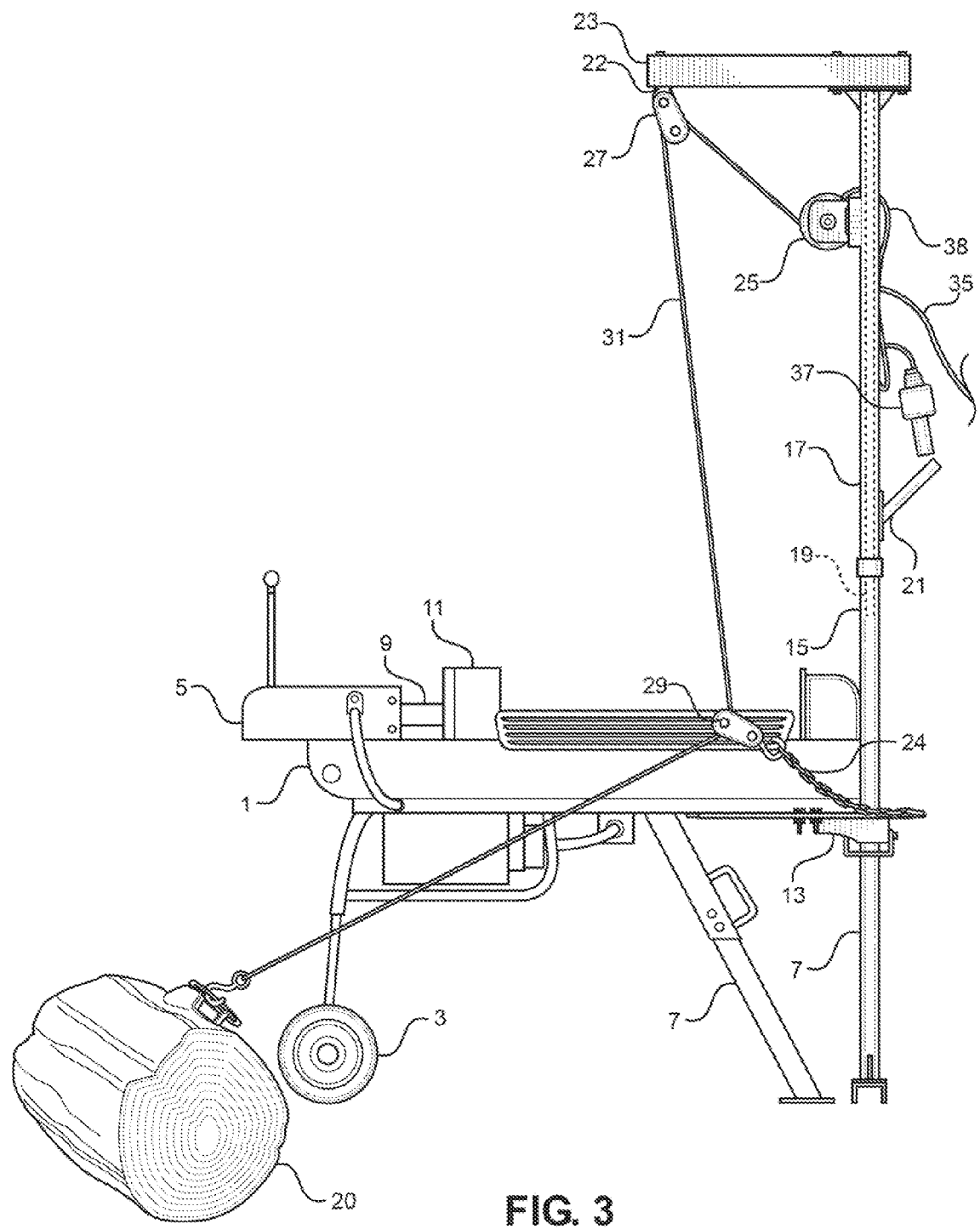
FIG. 3 is a side view of an embodiment of the present invention mounted to a two way split horizontal log splitting machine equipped with a lift arm assembly.

Embodiments of the present invention consist of apparatuses configured to drag logs from the field to a vertical or horizontal log splitter, then position those logs for splitting by a horizontal or vertical log splitter.

A log splitter includes a main frame [1] to which is attached an axle and wheel assembly [3], a tongue and hitch assembly [5], a stabilizing foot [7], and a press mechanism [9] used to force logs against a wedge [11]. At sufficient levels of force, the log is split. When the splitter is a horizontal splitter, the main frame [1] is oriented horizontally and the press mechanism [9] operates horizontally. When the splitter is a vertical splitter, the main frame [1] is oriented vertically and the press mechanism [9] operates vertically.

In one embodiment, the present invention comprises a positioning apparatus for use in connection with a horizontal log splitter. In another embodiment, the invention comprises a positioning apparatus for use in connection with a vertical log splitter. Versions of the present invention comprise a mast support assembly [13] adaptable for attachment to the main frame [1]. The mast support assembly [13] is fixedly connected to a main mast [15]. The main mast [15] is rotatably connected to a boom support [17]. Such connection can be accomplished with, by way of illustration, a bushing assembly [19] adapted to allow said boom support [17] to rotate with respect to said main mast [15]. Optionally, a boom swing control apparatus [21] may be connected to one or more of said boom support [17], said main mast [15], or said bushing assembly [19] to limit, control, or manipulate the rotation of said boom support [17]. Optionally, the apparatus of the present invention may also comprise a stabilizing foot [7], which may operate independently or may operate in cooperate with a stabilizing foot [7] integrated into the log splitter.

The boom support [17] is connected to a boom arm [23]. A first pulley [27] is connected to a first mount point [22] located on said boom arm [23]. A second pulley [29] is connected a second mount point [24]. Said second mount point [24] may be located anywhere on the apparatus of the present invention or preferably on the main frame [1] of a log splitter, provided that it must be lower than, and substantially in vertical alignment with, said first pulley [27]. Appropriate locations for said second mount point [24] include, for example locations on the splitter the main frame [1]. Preferably, at least said second mount point [24] engages a releasable connection with said second pulley [29], and, more preferably, said second mount point [24] comprises a chain connected to one of said main frame, main mast support, main mast, and said second pulley [29] comprises a hook, carabiner, or other means of connection to said chain. The first pulley [27] and second pulley [29] are adapted such that a cable [31] running from a winch [25] and threaded through the first pulley [27] and the second pulley [29] will, when force is exerted against the end of the cable [31] by the winch [25], direct such force in a substantially vertical direction with respect to the boom arm [23]. Optionally, the second pulley [29] may be connected to a portion of the apparatus or a portion of the log splitter other than the main frame [1].

A winch [25] may be releasably or fixedly connected to the apparatus, and preferably connected to one of the boom arm and the boom arm support, provided that it is positioned to connect with the cable [31]. The cable [31] is at one end releasably or fixedly coupled to the winch [25], and, at the other end, comprises a means for connection to logs. Such connection means includes one or more hooks, loops, straps, harnesses, caribiners, or other connection means known to the art.

The winch [25] is preferably actuated by a power source [33]. Said power source [33] can be adjacent to, integrated with, or remote from said winch [25] and can optionally be fixedly or releasably connected to said boom support [17], said mast [15], said mast support [13], or any portion of a log splitter. Said power source [33] may be operatively connected to said winch by a power wire harness [35]. Said power source [33] may further comprise a dedicated battery, a non-dedicated battery (including, by way of example, a car battery), an electrical outlet, or any source of A/C or D/C current with amperage and voltage in appropriate ranges for operation of the winch [25], as will be apparent to one skilled in the art.

Said winch [25] is preferably operatively connected to a winch control [37]. Said winch control [37] can be adjacent to, integrated with, or remote from said winch [25] and can be fixedly or releasably connected to said boom support [17], said mast [15], said mast support [13], or any portion of a log splitter. Said winch control [37] may be operatively connected to said winch by a control wire harness [38].

In operation, embodiments of the present invention can be used to drag logs on the ground remote from the splitter to a location closer to the splitter, and then, from that closer location, can aid in lifting and positioning the log for splitting. By way of example, and without limitation, one example of use of one embodiment of the present invention is described as follows: Operator 1 manually retrieves a log from the ground and places it on a horizontal splitter for splitting. Operator 1 will operate the splitter to split the log. Meanwhile, Operator 2 attaches the cable via the cable connection means to a log distant from the splitter. While Operator 1 continues to split logs being, placed manually on the splitter, Operator 2 actuates the winch to intake the cable. As the winch intakes cable, the log connected to the cable via the cable connection means is dragged from its distant location to a location substantially adjacent to the splitter. Continued splitting of other manually placed logs can, but does not need, to occur while this dragging operation is in process. Operator 2 uses the winch control to stop the cable intake when the log connected to the cable is at a desired location. Operator 2 removes the cable connection means, in this example, a drag pulley hook, and notifies Operator 1 that a log is ready for lift. Operator 1 continues splitting manually placed logs while Operator 2 disconnects the second pulley from the second pulley mount. Operator 2 then actuates the winch control to intake the cable, and this cable intake results in the previously connected log being lifted above the level of the main frame. Operator 2 then rotates the boom arm to move the log to the desired position over the splitter, and actuates the winch control to output cable and lower the log into a position to be split.

Although the present invention has been described in considerable detail with reference to certain preferred versions thereof, other versions are possible. For example, materials, lengths, structures, mount positions, pulley positions, cable intake/outtake means, log splitter types, or shapes, may be used for an apparatus according to versions of this invention other than those described in detail herein. Therefore, the spirit and scope of the claims should not be limited to the description of the preferred versions described herein.

What is claimed is:

1. An apparatus for dragging logs to a log splitter, said apparatus comprising a log splitter comprising a main frame, a main mast support detachably attached to said main frame, a main mast connected to said main mast support, a boom support connected to said main mast, a boom arm connected to said boom support, a winch directly connected to at least one of said boom arm and said boom support, a first mount point connected to said boom arm at a first height, a first pulley connected to said first mount point, a second mount point connected to said apparatus at a second height lower than said first height, a second pulley comprising a detachable attachment means comprising one or more of a hook, a ring, a clamp, or a carabiner, said detachable attachment means detachably attached to said second mount point, and a cable operatively connected to said winch and threaded through said first pulley and said second pulley, said cable comprising at one end a connection means such that when said cable is connected by said connection means to a log at a first position remote from said apparatus and said winch is actuated to intake said cable, said log is dragged from said first location to a second location proximate to said apparatus.

2. The apparatus of claim 1, wherein said boom arm is connected rotatably to said main mast.

3. The apparatus of claim 2, further comprising a boom control operatively connected to at least one of said main mast and said boom support.

4. The apparatus of claim 1, further comprising a power source operatively connected to said winch.

5. The apparatus of claim 4, wherein said power source is at least one of: a dedicated battery, a non-dedicated battery, an inverter, a generator, or an electrical outlet.

6. The apparatus of claim 5, further comprising a winch control operatively connected to said winch.

7. The apparatus of claim 6, in which said log splitter comprises at least one of a horizontal log splitter, a horizontal-to vertical log splitter, or a two-way wedge log splitter.

8. The apparatus of claim 7, wherein a portion of at least one of said main mast, said main mast support, or said main frame comprises said second mount point.

9. The apparatus of claim 8, wherein said first mount point and said first pulley are positioned with respect to said second mount point and said second pulley such that when said cable is threaded through said first pulley and said second pulley, said connection means is connected to a log at a first location, and said winch is actuated to intake said cable, a portion of said cable adjacent to said first mount point remains substantially perpendicular to said boom arm.

10. The apparatus of claim 9, wherein said boom arm is rotatable with respect to said main mast, and further comprising a winch control operatively connected to said winch, wherein when said cable is connected by said connection means to a log located at said first location and said winch is actuated by said winch control to intake said cable, said log is dragged from said first location remote from a log splitter to said second location and is then lifted from the ground, and wherein further said winch can be actuated by said winch control to cease intake of said cable when said log is positioned at a height suitable for manually positioning said log on said apparatus for splitting said log using said apparatus.

11. An apparatus for dragging logs to a log splitter, said apparatus comprising a log splitter with main frame, a main mast support removably connected to said main frame, a main mast connected to said main mast support, a boom support connected to said main mast, a boom arm connected to said boom support, a winch directly connected to at least one of said boom arm and said boom support, a first mount point connected to said boom arm at a first height, a first pulley connected to said first mount point, a second mount point connected to said apparatus at a second height located below said first height, a second pulley comprising a detachable attachment means comprising one or more of a hook, a ring, a clamp, or a carabiner, detachably attached to said apparatus by said detachable attachment means at a height located below said first height and at a location other than said second mount point, and a cable operatively connected to said winch and threaded through said first pulley and said second pulley, said cable comprising a one end a connection means, such that when said cable is connected by said connection means to a log located at a second location proximate to said apparatus and said winch is actuated to intake said cable, said log is lifted from said second location to a height suitable for positioning said log for splitting on said log splitter.

12. The apparatus of claim 11, wherein said second mount point is comprised of a portion of at least one of said main mast, said main mast support, or said main frame.

13. The apparatus of claim 12, wherein said connection means comprises at least one of a hook, a threaded connection, a rope, a strap, a chain, and a clevis.

14. The apparatus of claim 10, wherein said second pulley is disconnected from said apparatus after said log is dragged from said first location to said second location and prior to said log being lifted to a height suitable for positioning said log for splitting on said log splitter.

15. The apparatus of claim 14, wherein said connection means comprises at least one of a hook, a threaded connection, a rope, a strap, a chain, and a clevis.

* * * * *